(12) United States Patent
Ogikubo

(10) Patent No.: US 11,785,349 B2
(45) Date of Patent: *Oct. 10, 2023

(54) IMAGING APPARATUS AND IMAGE PROCESSING APPARATUS

(71) Applicant: Sony Group Corporation, Tokyo (JP)

(72) Inventor: Junichi Ogikubo, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,067

(22) Filed: Apr. 22, 2022

(65) Prior Publication Data

US 2022/0247892 A1 Aug. 4, 2022

Related U.S. Application Data

(63) Continuation of application No. 16/909,445, filed on Jun. 23, 2020, now Pat. No. 11,343,411, which is a
(Continued)

(30) Foreign Application Priority Data

Dec. 28, 2011 (JP) .................................. 2011-288583

(51) Int. Cl.
*H04N 23/81* (2023.01)
*H04N 9/67* (2023.01)
(Continued)

(52) U.S. Cl.
CPC ............. *H04N 23/81* (2023.01); *G06T 5/009* (2013.01); *G11B 27/031* (2013.01);
(Continued)

(58) Field of Classification Search
CPC ...... H04N 23/81; H04N 5/2628; H04N 9/646; H04N 9/67; H04N 9/69; H04N 23/70;
(Continued)

(56) References Cited

U.S. PATENT DOCUMENTS 6,507,704 B2 1/2003 Enomoto
2005/0207629 A1 9/2005 Toyoda
(Continued)

FOREIGN PATENT DOCUMENTS

EP 1 130 594 9/2001
EP 1 578 109 A2 9/2005
(Continued)

OTHER PUBLICATIONS

Search Report issued in corresponding European application No. 12863498.7 dated Jan. 7, 2016.
(Continued)

*Primary Examiner* — Padma Haliyur
(74) *Attorney, Agent, or Firm* — Robert E. Colletti; Haug Partners LLP

(57) ABSTRACT

[Object] To quickly and correctly reproduce an image intended by a photographer, a cinematographer, and the like on the occasion of post-production.

[Solving Means] The development apparatus includes: an imaging unit that performs shooting and generates RAW data; a first conversion unit that converts the generated RAW data into image data by interpolation; an acquisition unit that acquires an exposure index value corresponding to an illuminance of a shooting environment; a first correction unit that corrects a value of the image data based on the exposure index value; and an output unit that associates the RAW data and the acquired exposure index value with each other and outputs the associated RAW data and exposure index value.

24 Claims, 7 Drawing Sheets

Related U.S. Application Data continuation of application No. 16/233,176, filed on Dec. 27, 2018, now Pat. No. 10,694,079, which is a continuation of application No. 15/616,986, filed on Jun. 8, 2017, now Pat. No. 10,218,881, which is a continuation of application No. 14/367,764, filed as application No. PCT/JP2012/007848 on Dec. 7, 2012, now Pat. No. 9,712,725.

(51) Int. Cl.
| | |
|---|---|
| H04N 9/69 | (2023.01) |
| G11B 27/031 | (2006.01) |
| G11B 27/30 | (2006.01) |
| G06T 5/00 | (2006.01) |
| G11B 27/034 | (2006.01) |
| H04N 23/70 | (2023.01) |
| H04N 23/76 | (2023.01) |
| H04N 23/80 | (2023.01) |
| H04N 23/88 | (2023.01) |
| H04N 5/262 | (2006.01) |
| H04N 9/64 | (2023.01) |

(52) U.S. Cl.
CPC ........ *G11B 27/034* (2013.01); *G11B 27/3027* (2013.01); *H04N 5/2628* (2013.01); *H04N 9/646* (2013.01); *H04N 9/67* (2013.01); *H04N 9/69* (2013.01); *H04N 23/70* (2023.01); *H04N 23/76* (2023.01); *H04N 23/80* (2023.01); *H04N 23/88* (2023.01)

(58) Field of Classification Search
CPC ........ H04N 23/76; H04N 23/80; H04N 23/88; G06T 5/009; G11B 27/031; G11B 27/034; G11B 27/3027
See application file for complete search history.

(56) References Cited

U.S. PATENT DOCUMENTS

| | | |
|---|---|---|
| 2006/0202032 A1 | 9/2006 | Kricorissian |
| 2008/0037868 A1 | 2/2008 | Han et al. |
| 2008/0187235 A1 | 8/2008 | Wakazono et al. |
| 2009/0147098 A1 | 6/2009 | Li |
| 2009/0174726 A1 | 7/2009 | Ollivier |
| 2010/0220989 A1* | 9/2010 | Hashigami ............ G03B 7/085 396/257 |
| 2011/0001843 A1 | 1/2011 | Koishi |
| 2012/0002082 A1 | 1/2012 | Johnson |

FOREIGN PATENT DOCUMENTS

| | | |
|---|---|---|
| EP | 1 578 109 A3 | 2/2008 |
| EP | 2 063 635 | 5/2009 |
| JP | 2001-223979 | 8/2001 |
| JP | 2002-182299 | 6/2002 |
| JP | 2004-040559 | 2/2004 |
| JP | 2005-070862 | 3/2005 |
| JP | 2005-269145 | 9/2005 |
| JP | 2006-287365 | 10/2006 |
| JP | 2007-043373 | 2/2007 |
| JP | 2007-141152 | 6/2007 |
| JP | 2009-520395 | 5/2009 |
| JP | 2009-183009 | 8/2009 |
| JP | 2010-063036 | 3/2010 |

OTHER PUBLICATIONS

Office Action issued in the corresponding Japanese application No. 2011-288583 dated Mar. 1, 2016.
Japanese Office Action dated Oct. 4, 2016.
Japanese Office Action dated Jul. 16, 2019.
PhotoForge 2 Released, Brings Powerful Image Edition to . . . ; Jan. 28, 2020.
PhotoForge 2 Preview, YouTube; online; May 2011.
Japanese Office Action dated Jan. 28, 2020.
Japanese Office Action dated Apr. 28, 2020.

* cited by examiner

| Illuminance (dB) | EI |
|---|---|
| −12 | 200EI |
| −10 | 250EI |
| −8 | 320EI |
| −6 | 400EI |
| −4 | 500EI |
| −2 | 640EI |
| 0 | 800EI |
| +2 | 1000EI |
| +4 | 1250EI |
| +6 | 1600EI |
| +8 | 2000EI |
| +10 | 2500EI |
| +12 | 3200EI |

FIG.3

| Reduction ratio(%) | Aspect ratio of monitor screen (Set value of AtFormat/AspectSet) | | | |
|---|---|---|---|---|
| | 4096 : 2160 | | 3840 : 2160 | |
| Effective Ratio | Effective Marker Coverage | Effective Marker Aspect Ratio | Effective Marker Coverage | Effective Marker Aspect Ratio |
| 100 | 4096 : 4096 | 4096 : 2160 | 3840 : 3840 | 3840 : 2160 |
| 90 | 3686 : 4096 | 3686 : 1944 | 3456 : 3840 | 3456 : 1944 |
| 80 | 3277 : 4096 | 3277 : 1728 | 3072 : 3840 | 3072 : 1728 |
| 70 | 2867 : 4096 | 2867 : 1512 | 2688 : 3840 | 2688 : 1512 |

FIG.5

IMAGING APPARATUS AND IMAGE PROCESSING APPARATUS

This is a continuation of U.S. Ser. No. 16/909,445, filed Jun. 23, 2020, which is a continuation of U.S. Ser. No. 16/233,176, filed Dec. 27, 2018, now U.S. Pat. No. 10,694,079, issued Jun. 23, 2020, which is a continuation of U.S. Ser. No. 15/616,986, filed Jun. 8, 2017, now U.S. Pat. No. 10,218,881, issued Feb. 26, 2019, which is a continuation of application Ser. No. 14/367,764, filed Jun. 20, 2014, now U.S. Pat. No. 9,712,725, issued Jul. 18, 2017, which is a U.S. national phase application of PCT/JP2012/007848, filed Dec. 7, 2012, which is entitled to the priority filing date of Japanese application 2011-288583, filed on Dec. 28, 2011, the entirety of which is incorporated herein by reference.

TECHNICAL FIELD

The present technology relates to an imaging apparatus that performs RAW shooting and to a post-production apparatus that performs post-production for RAW data captured by the imaging apparatus.

BACKGROUND ART

In the creation process of video content that is constituted by connecting various video scenes containing captured video materials, an operation of imaging a scene by using a camera and an operation of performing post-production processing on the captured image source are sequentially performed. A content creation system for efficiently performing those operations is proposed (see, for example, Patent Document 1).

In the content creation system described in Patent Document 1, two types of correction parameters including a camera set value, which is set at the time of shooting, and an effect correction value, which adjusts a video, are used in the post-production processing. The camera set value is a set value at the time of shooting and includes, for example, values for setting the functions of the camera, such as exposure, white balance, gamma correction, and color adjustment. On the other hand, the effect correction value is a set value that is used to correct a video after shooting in order to obtain a predetermined image quality. For example, the effect correction value includes values for adjusting attributes on the effect of a video, such as exposure, white balance, gamma correction, 3D effect, trimming, and zooming. At the time of the post-production processing, a correction parameter value that is set by a user via an operation input unit, a correction parameter value that is set in the past edit information stored in a database, and the like are used.
Patent Document 1: Japanese Patent Application Laid-open No. 2007-43373 (paragraph Nos. [0076] to [0113] and FIG. 14 to FIG. 16)

SUMMARY OF INVENTION

Problem to be Solved by the Invention

In recent years, in a shooting location, various parameters have been given to the imaging apparatus and thus it has been possible to check an image obtained after development. Further, a system in which the parameters used in the imaging apparatus are transmitted as metadata together with RAW data to the post-production apparatus side and reflected on the development in post-production has been studied.

The present technology provides an imaging apparatus and an image processing apparatus that are capable of achieving a more highly functional system in which parameters used in the imaging apparatus are transmitted as metadata together with RAW data to the post-production apparatus side and reflected on development in post-production, reproducing an image intended by a photographer, a cinematographer, and the like more quickly and correctly on the occasion of post-production, and improving the operation efficiency of post-production.

Means for Solving the Problem

To solve the problems described above, according to the present technology, there is provided an imaging apparatus including: an imaging unit that performs shooting and generates RAW data; a first conversion unit that converts the generated RAW data into image data by interpolation; an acquisition unit that acquires an exposure index value corresponding to an illuminance of a shooting environment; a first correction unit that corrects a value of the image data based on the exposure index value; and an output unit that associates the RAW data and the acquired exposure index value with each other and outputs the associated RAW data and exposure index value.

The acquisition unit may include an illuminance acquisition unit that acquires a measured value from an illuminometer and converts the measured value into the exposure index value.

The acquisition unit may further acquire information on an effective area for post-production of the image data. The output unit may associate the RAW data and the acquired information on an effective area with each other and output the associated RAW data and information on an effective area.

The acquisition unit may further acquire information for a color correction of the image data. The output unit may associate the RAW data and the acquired information for a color correction with each other and output the associated RAW data and information for a color correction.

The information for a color correction can be the American Society of Cinematographers Color Decision List (ASC-CDL).

To solve the problems described above, according to the present technology, there is provided an image processing apparatus including: an input unit that inputs RAW data output from an imaging apparatus and an exposure index value associated with the RAW data; a second conversion unit that converts the RAW data into image data by interpolation; and a second correction unit that corrects a value of the image data based on the exposure index value.

The input unit may further input information on an effective area for post-production of the image data. The image processing apparatus may further include a clipping unit that clips a part corresponding to the effective area from the image data based on the information on an effective area.

The input unit may further input information for a color correction of the image data. The image processing apparatus may further include a color correction unit that performs a color correction of the image data based on the information for a color correction.

The information for a color correction can be the American Society of Cinematographers Color Decision List (ASC-CDL).

Effect of the Invention

As described above, according to the present technology, it is possible to reproduce an image intended by a photographer, a cinematographer, and the like more quickly and correctly on the occasion of post-production, and improve the operation efficiency of post-production.

BRIEF DESCRIPTION OF DRAWINGS

FIG. 3 is a diagram showing a correspondence table of an illuminance measurement value (dB) and an EI.

FIG. 5 is a diagram showing a metadata structure of an effective marker.

MODE(S) FOR CARRYING OUT THE INVENTION

Figure 1:
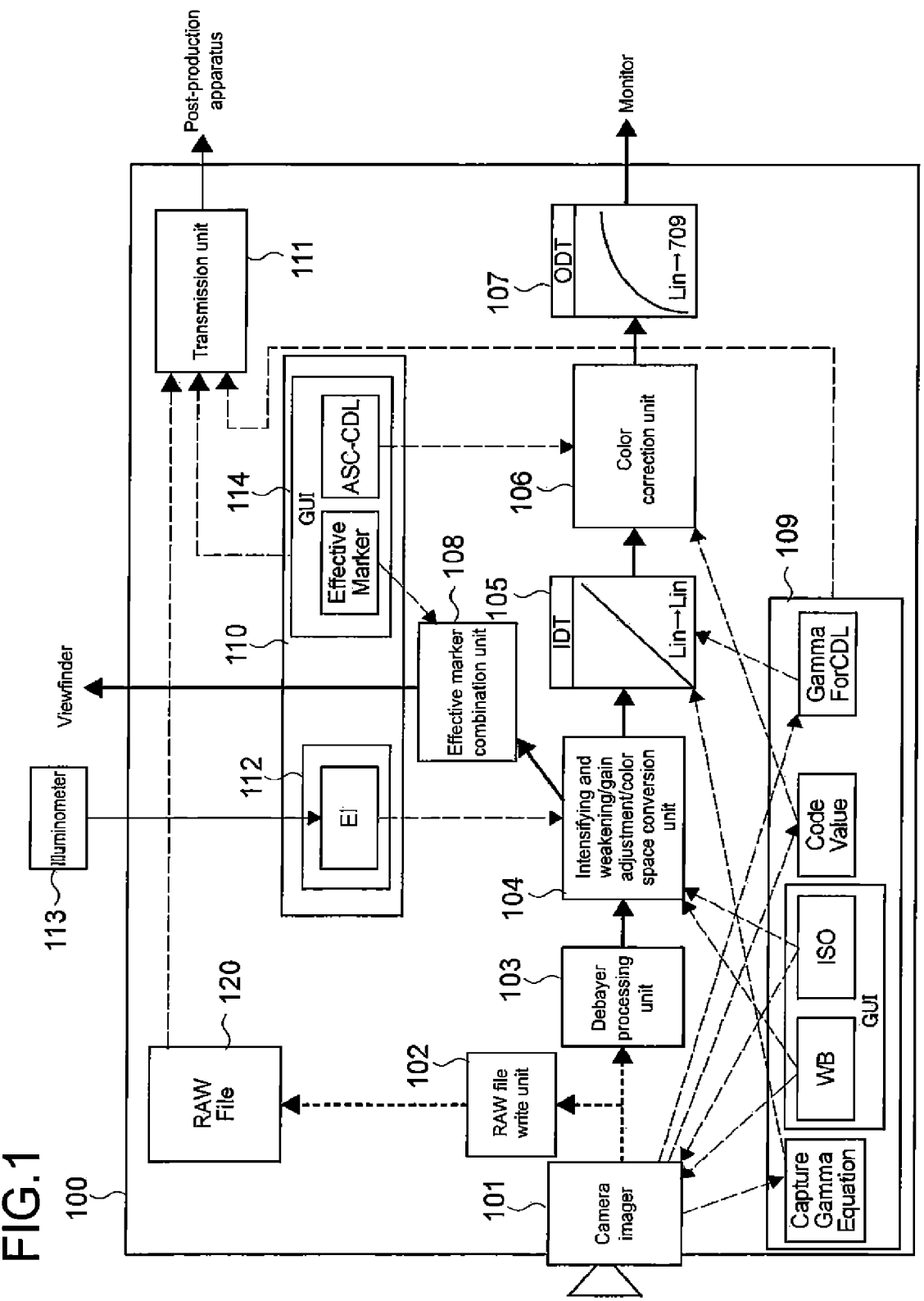
FIG. 1 is a block diagram showing a configuration of an imaging apparatus according to an embodiment of the present technology.

Hereinafter, an embodiment of the present technology will be described.

This embodiment relates to an imaging apparatus that performs RAW imaging and recording and to a post-production apparatus that acquires RAW data captured by the imaging apparatus and development metadata for the RAW data and performs post-production.

In the imaging apparatus, image data, which is obtained by performing color interpolation processing, intensifying and weakening processing, gain adjustment, color adjustment, and the like on the RAW data captured by the camera imager, can be displayed on a monitor connected to the imaging apparatus or in a viewfinder provided to the imaging apparatus such that the image data can be checked in real time by a photographer, a cinematographer, and the like in a shooting location. While checking the image data displayed on the monitor or in the viewfinder, the photographer, the cinematographer, and the like can set various development parameters for the image data as part of metadata.

Here, the metadata includes:

1. Metadata automatically reflected on image data in the post-production apparatus; and
2. Metadata arbitrarily reflected on image data in the post-production apparatus, that is, recommended metadata, such as "the development is required to be performed in such a way", to an operator who performs the post-production by the photographer, the cinematographer, and the like in the shooting location.

It is assumed that the former is referred to as "first metadata" and the latter is referred to as "second metadata".

Further, the first metadata includes a parameter that is uniquely determined to correspond to the type of a camera imager to be used, and a parameter that is set artificially at the time of shooting.

The imaging apparatus associates the RAW data and the metadata described above with each other to be transmitted to the post-production apparatus.

In the post-production apparatus, the RAW data and the metadata transmitted from the imaging apparatus are acquired, the first metadata is automatically reflected on the development of the RAW data, and its result is displayed on a monitor connected to the post-production apparatus. Further, the second metadata is appropriately reflected on the development of the RAW data according to an instruction of the operator of the post-production. With this, the image data and the recommended image data that are intended by the photographer, the cinematographer, and the like can be reproduced on the occasion of post-production.

The first metadata described above includes the following data, for example.

1. Shooting gamma (Capture Gamma Equation)

The shooting gamma includes, for example, Scene Linear, Cine-Log, and S-Log developed by Sony Corporation.

2. White balance
3. Imager sensitivity (ISO Sensitivity)
4. Values of black/gray/white of RAW data (RAW Code Value)
5. Gamma conforming to CDL (Gamma For CDL)

Here, the shooting gamma, the values of black/gray/white of RAW data, and the gamma conforming to CDL are parameters that are uniquely determined depending on the type of the camera imager used in the imaging apparatus. The white balance and the imager sensitivity are data selected by a photographer and the like at the time of shooting.

The second metadata described above includes the following data, for example.

1. EI (Exposure Index of Photo Meter)

The EI is an exposure index value corresponding to an illuminance obtained from the illuminometer. Based on the EI and the value of the imager sensitivity, the processing of gain adjustment for the image data, and the like are performed.

2. Effective Marker

The effective marker is information for identifying an effective area in the captured image data, the effective area being intended by the photographer, the cinematographer, and the like in the shooting location. In the post-production apparatus, the clipping of an effective area from the image data, and the like are performed based on the information of the effective marker.

3. ASC-CDL (The American Society of Cinematographers Color Decision List)

The ASC-CDL is information for color correction that is defined by The American Society of Cinematographers (ASC). In the ASC-CDL, color is defined by three parameters of an offset (output value when input is zero), a slope (gain of input and output), and power (gamma curve characteristics of input and output) for each of R, G, and B.

Those items of the second metadata are each appropriately selected by the photographer, the cinematographer, and the like in the shooting location. In the imaging apparatus, an image on which those items of the second metadata have been reflected can be seen through the monitor.

The first metadata and the second metadata that are set in the imaging apparatus are, for example, gathered as a file in an XML (Extensible Markup Language) format or the like and associated with the file of the RAW data, to be stored in the storage or transmitted to the post-production apparatus or the like via a communication medium.

Hereinafter, a first embodiment of the present technology will be described with reference to the drawings.

[Imaging Apparatus]

FIG. 1 is a block diagram showing a configuration of an imaging apparatus 100 according to an embodiment of the present technology.

As shown in FIG. 1, the imaging apparatus 100 of this embodiment includes a camera imager 101, a RAW file write unit 102, a first Debayer processing unit 103, a first intensifying and weakening/gain adjustment/color space conversion unit 104, a first IDT (Input Device Transform) processing unit 105, a first color correction unit 106, a first ODT (Onput Device Transform) processing unit 107, an effective marker combination unit 108, a first metadata acquisition unit 109, a second metadata acquisition unit 110, and a transmission unit 111.

The imaging apparatus 100 includes, as another hardware configuration, a computer system including a CPU (Central Processing Unit), a ROM (Read Only Memory), a main memory, storage, a network I/F, and the like. The main memory and the storage store programs executed by the CPU. The CPU executes the programs and thus causes the computer system to operate as the RAW file write unit 102, the first Debayer processing unit 103, the first intensifying and weakening/gain adjustment/color space conversion unit 104, the first IDT processing unit 105, the first color correction unit 106, the first ODT processing unit 107, the effective marker combination unit 108, the first metadata acquisition unit 109, the second metadata acquisition unit 110, and the transmission unit 111.

The camera imager 101 (imaging unit) is an imager for RAW shooting and is, for example, a CMOS (Complementary Metal Oxide Semiconductor).

The RAW file write unit 102 writes the RAW data obtained by the camera imager 101 in the file 120 without change.

The first Debayer processing unit 103 (first conversion unit) performs color interpolation and the like on the RAW data and thus generates RGB images (image data).

The first intensifying and weakening/gain adjustment/color space conversion unit 104 (first correction unit) performs intensifying processing, weakening processing, and the like on the image data converted by the first Debayer processing unit 103. The first intensifying and weakening/gain adjustment/color space conversion unit 104 performs gain adjustment on the image data that has been subjected to the intensifying processing and weakening processing, based on the white balance and the imager sensitivity (ISO Sensitivity) that belong to the first metadata acquired by the first metadata acquisition unit 109 and on the EI (Exposure Index Of Photo Meter) that belongs to the second metadata acquired by the second metadata acquisition unit 110, and converts the color space of the image data into a standard color space from the color space of the camera imager 101.

The first IDT processing unit 105 converts the image data output from the first intensifying and weakening/gain adjustment/color space conversion unit 104 into a value for color adjustment using the ASC-CDL, based on the shooting gamma (Capture Gamma Equation) and the gamma conforming to CDL (Gamma For CDL) that belong to the first metadata acquired by the first metadata acquisition unit 109.

The first color correction unit 106 applies the ASC-CDL acquired by the second metadata acquisition unit 110 to the image data converted by the first IDT processing unit 105 and performs color correction.

The first ODT processing unit 107 converts the color space of the image data whose color is corrected by the first color correction unit 106 into a color space of a monitor connected to the imaging apparatus 100, to be output to the monitor.

The effective marker combination unit 108 combines graphics of the effective marker acquired by the second metadata acquisition unit 110 with the image data output from the first intensifying and weakening/gain adjustment/color space conversion unit 104 to be output to the viewfinder.

The first metadata acquisition unit 109 acquires the shooting gamma, the white balance, the values of black/gray/white of the RAW data, and the gamma conforming to CDL, which are the first metadata, and supplies the shooting gamma, the white balance, the values of black/gray/white of the RAW data, and the gamma conforming to CDL to the camera imager 101, the first intensifying and weakening/gain adjustment/color space conversion unit 104, the first IDT processing unit 105, and the first color correction unit 106.

The second metadata acquisition unit 110 acquires the EI, the effective marker, and the ASC-CDL, which are second metadata, and supplies the EI, the effective marker, and the ASC-CDL to the first intensifying and weakening/gain adjustment/color space conversion unit 104, the effective marker combination unit 108, and the first color correction unit 106.

The second metadata acquisition unit 110 includes an EI acquisition unit 112 (illuminance acquisition unit) that acquires the EI. The EI acquisition unit 112 acquires in real time a measured value transmitted from the illuminometer 113 in a wired or wireless manner and converts the measured value into a value of the EI (Exposure Index of Photo Meter) that is the exposure index value. Further, the second metadata acquisition unit 110 includes a graphical user interface (GUI) 114. Through the graphical user interface (GUI) 114, the effective marker and the ASC-CDL that are input by the photographer, the cinematographer, and the like are received and thus acquired.

The transmission unit 111 (output unit) associates the RAW data and the metadata acquired in the imaging apparatus 100 with each other to be transmitted to a subsequent processing environment (post-production apparatus 200 and the like).

[Post-Production Apparatus]

Figure 2:
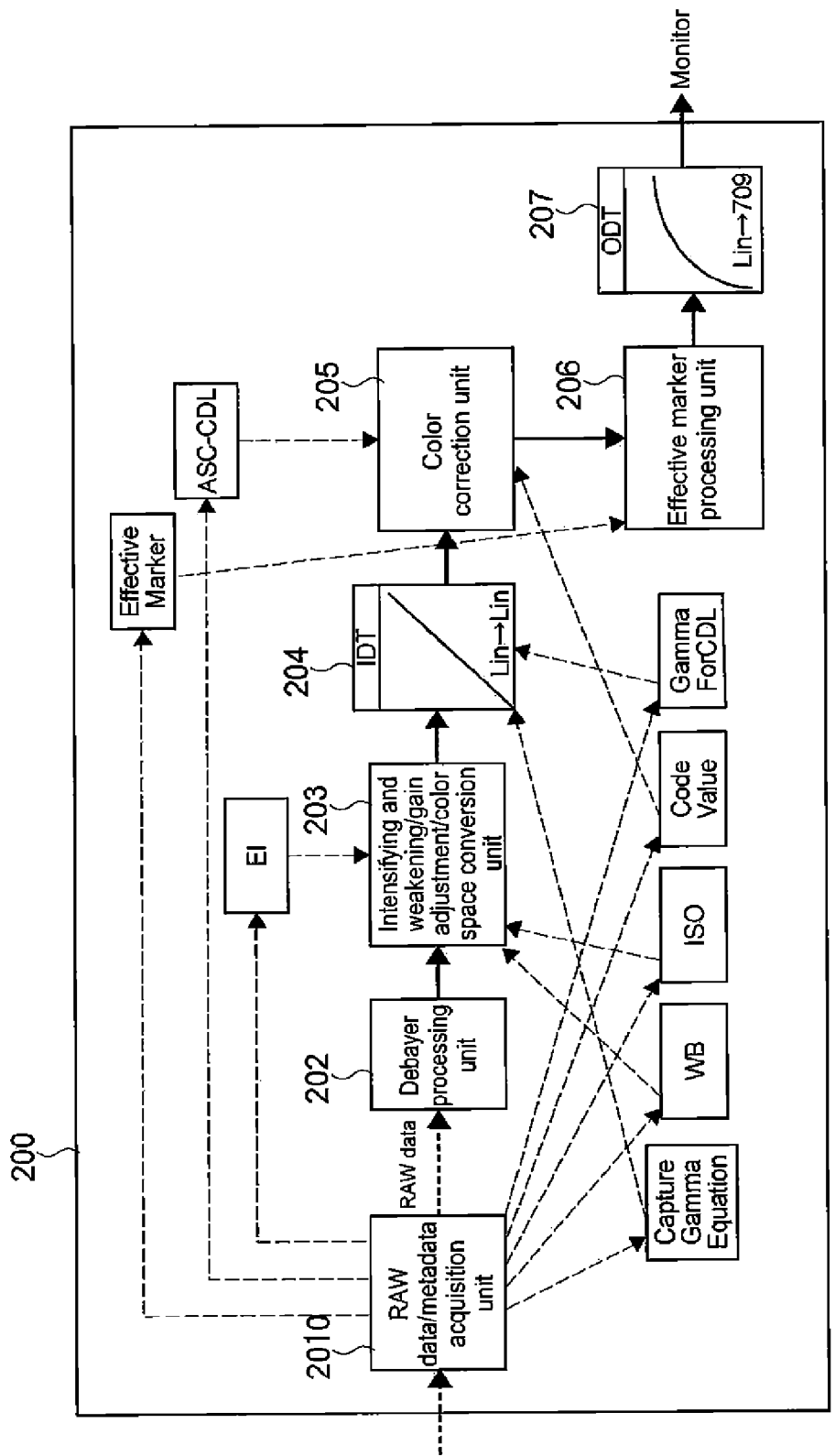
FIG. 2 is a block diagram showing a configuration of a post-production apparatus according to an embodiment of the present technology.

FIG. 2 is a block diagram showing a configuration of the post-production apparatus 200 according to an embodiment of the present technology.

As shown in FIG. 2, the post-production apparatus 200 (image processing apparatus) of this embodiment includes a RAW data/metadata acquisition unit 201, a second Debayer processing unit 202, a second intensifying and weakening/gain adjustment/color space conversion unit 203, a second IDT processing unit 204, a second color correction unit 205, an effective marker processing unit 206, and a second ODT processing unit 207.

The post-production apparatus 200 includes, as another hardware configuration, a computer system including a CPU (Central Processing Unit), a ROM (Read Only Memory), a main memory, storage, a network I/F, a monitor, an input device such as a mouse and a keyboard, and the like. The main memory and the storage store programs executed by the CPU. The CPU executes the programs and thus causes the computer system to operate as the RAW data/metadata acquisition unit 201, the second Debayer processing unit 202, the second intensifying and weakening/gain adjustment/color space conversion unit 203, the second IDT processing unit 204, the second color correction unit 205, the effective marker processing unit 206, and the second ODT processing unit 207.

The RAW data/metadata acquisition unit 201 (input unit) acquires the RAW file and the metadata that are transmitted from the imaging apparatus 100.

The second Debayer processing unit 202 (second conversion unit) performs color interpolation and the like on the RAW data and thus generates RGB images (image data), as in the imaging apparatus 100.

The second intensifying and weakening/gain adjustment/color space conversion unit 203 (second correction unit) performs intensifying processing, weakening processing, and the like on the RGB images (image data) converted by the second Debayer processing unit 202. The second intensifying and weakening/gain adjustment/color space conversion unit 203 performs gain adjustment on the image data that has been subjected to the intensifying processing and weakening processing, based on the white balance and the imager sensitivity (ISO Sensitivity) that belong to the first metadata acquired by the RAW data/metadata acquisition unit 201 and on the EI (Exposure Index Of Photo Meter) that belongs to the second metadata, and converts the color space of the image data into a standard color space from the color space of the camera imager 101 of the imaging apparatus 100.

The second IDT processing unit 204 converts the image data output from the second intensifying and weakening/gain adjustment/color space conversion unit 203 into a value for color correction using the ASC-CDL, based on the shooting gamma (Capture Gamma Equation) and the gamma conforming to CDL (Gamma For CDL) that belong to the first metadata acquired by the RAW data/metadata acquisition unit 201.

The second color correction unit 205 (color correction unit) applies the ASC-CDL acquired by the RAW data/metadata acquisition unit 201 to the image data converted by the second IDT processing unit 204 and performs color correction.

The effective marker processing unit 206 (clipping unit) performs processing of clipping the effective area from the image data that has been subjected to the color correction by the second color correction unit 205, resizing, and the like, based on the effective marker that belongs to the second metadata acquired by the RAW data/metadata acquisition unit 201.

The second ODT processing unit 207 converts the color space of the image data, which has been subjected to the clipping, resizing, and the like by the effective marker processing unit 206, into a color space of a monitor connected to the post-production apparatus 200, to be output to the monitor.

[Regarding Processing Based on Second Metadata]

In this embodiment, in the imaging apparatus 100, the EI, the effective marker, and the ASC-CDL are set as the second metadata aimed at recommending the reflection of the EI, the effective marker, and the ASC-CDL on the development processing of the RAW data, and are transmitted to the post-production apparatus 200 together with the RAW data and the first metadata. So, in each of the imaging apparatus 100 and the post-production apparatus 200, the same second metadata can be shared and the image data recommended by the photographer, the cinematographer, and the like can be reproduced on the occasion of post-production.

Next, description will be given on the processing based on the EI, the effective marker, and the ASC-CDL. It should be noted that the present technology does not have features in the following processing itself.

(Gain Adjustment Using EI)

Next, description will be given on an example of the processing based on the EI in the imaging apparatus 100 and the post-production apparatus 200.

In the imaging apparatus 100, the EI acquisition unit 112 of the second metadata acquisition unit 110 receives in real time a measured value (dB) transmitted from the illuminometer 113 in a wired or wireless manner and converts the measured value into a value of the EI (Exposure Index of Photo Meter) by using a table shown in FIG. 3. As shown in the table, the EI covers at least a plurality of integer values determined in the range of "200" to "3200" and sets "800" as a reference value.

In the imaging apparatus 100 and the post-production apparatus 200, the intensifying and weakening/gain adjustment/color space conversion units (103, 203) each calculates a gain that is applied to the value of white of the RAW data by the following expression.

$$EI/\text{Imager sensitivity} \quad (1)$$

So, when the value of the imager sensitivity (ISO Sensitivity) given as the first metadata is set to "800" and the EI is set to "1600", "2" is calculated as a value of a gain applied to the value of white of the RAW data.

Figure 4:
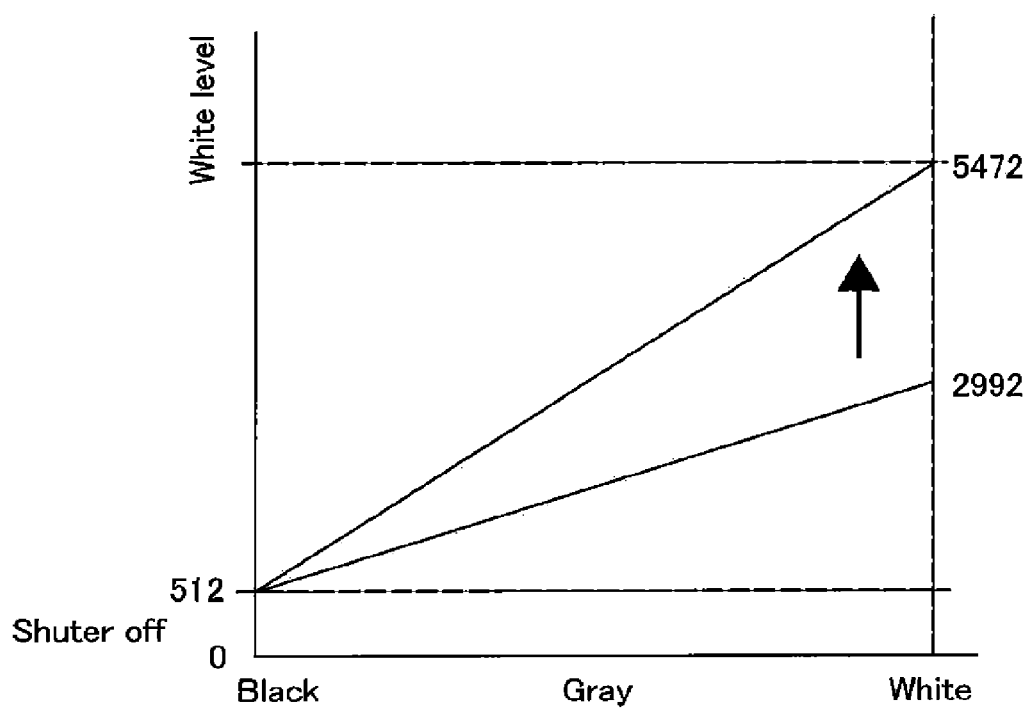
FIG. 4 is a diagram for describing a gain adjustment using the EI.

FIG. 4 is a graph showing a gain that is allocated to the image data by the intensifying and weakening/gain adjustment/color space conversion units (103, 203). Assuming that the dependence of the illuminance can be ignored because the value of black of the RAW data is a value when the shutter of the camera imager 101 is turned off, the gain is fixed to "1". In the case where "2" is calculated as the value of the gain applied to the value of white of the RAW data by the calculation method described above, the gain in the range from "1" to "2" is proportionally allocated to the value of the RAW data in the range from black to white.

More specifically, the value of black of the RAW Code Value (fixed value) is set to "512" and the value of white of the RAW Code Value (measured value) is set to "2992", (2992−512)×2=5472 is the value of white, which has been subjected to the gain adjustment.

As described above, in this embodiment, the EI is transmitted as the second metadata to the post-production apparatus 200, and thus an image with brightness that is seen by the photographer, the cinematographer, and the like on the monitor connected to the imaging apparatus 100 can be reproduced in the post-production apparatus 200. With this, the operation efficiency of the post-production can be improved.

[Processing Using Effective Marker]

Next, description will be given on the processing based on the effective marker in the imaging apparatus 100 and the post-production apparatus 200.

The effective marker is metadata that is aimed at expressing a framing intended by the photographer. As shown in FIG. 5, the effective marker is constituted of an Effective Marker Coverage that indicates a reduction ratio (ratio of long strip) of an effective area marker to the image frame of a payload and an Effective Marker Aspect Ratio that indicates an aspect ratio of the effective area marker. The first metadata acquisition unit 109 acquires the value of the reduction ratio of the marker from the user via the graphical user interface (GUI) 114 and determines the Effective Marker Coverage and the Effective Marker Aspect Ratio by a correlation with the aspect ratio of the screen of the monitor. The effective marker is transmitted as the second metadata by the transmission unit 111 to the post-production apparatus 200, together with the RAW data and the first metadata.

Figure 6:
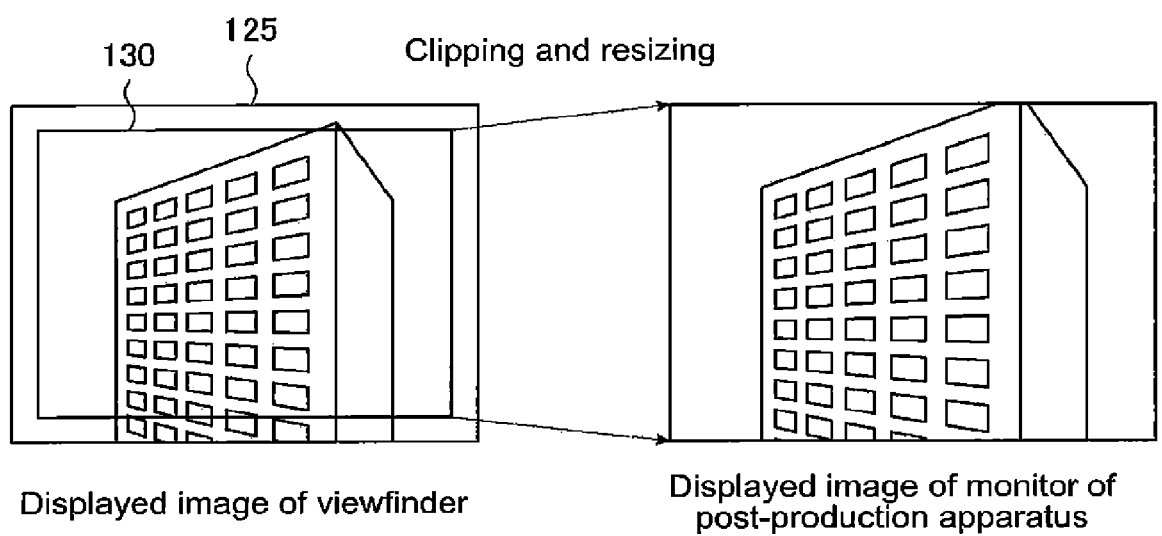
FIG. 6 is a diagram for describing processing using the effective marker.

As shown in FIG. 6, in the imaging apparatus 100, the effective marker combination unit 108 combines graphics 130 of the effective marker with an image 125 displayed in the viewfinder, based on the metadata of the effective marker acquired by the first metadata acquisition unit 109, to be displayed.

On the other hand, in the post-production apparatus 200, the effective marker processing unit 206 clips the effective area from the image data based on the metadata of the effective marker acquired by the RAW data/metadata acquisition unit 201, and enlarges the clipped image data to have the original resolution.

In such a manner, the effective marker is transmitted as the second metadata to the post-production apparatus 200, and thus the clipping processing and the like of the effective area intended by the photographer, the cinematographer, and the like can be performed quickly in the post-production apparatus 200. With this, the operation efficiency of the post-production can be improved.

[Color Correction Based on ASC-CDL]

Next, description will be given on the color correction based on the ASC-CDL in the imaging apparatus 100 and the post-production apparatus 200.

The ASC-CDL is information for color adjustment that is defined by The American Society of Cinematographers (ASC). In the ASC-CDL, color is defined by three parameters of an offset (output value when input is zero), a slope (gain of input and output), and power (gamma curve characteristics of input and output) for each of R, G, and B. It should be noted that the details of the color correction based on the ASC-CDL are disclosed in "ASC Color Decision List (ASC CDL) Transfer Functions and Interchange Syntax, ASC-CDL_Release1.2, Joshua Pines and David Reisner, 2009 May 4" and the like.

Figure 7:
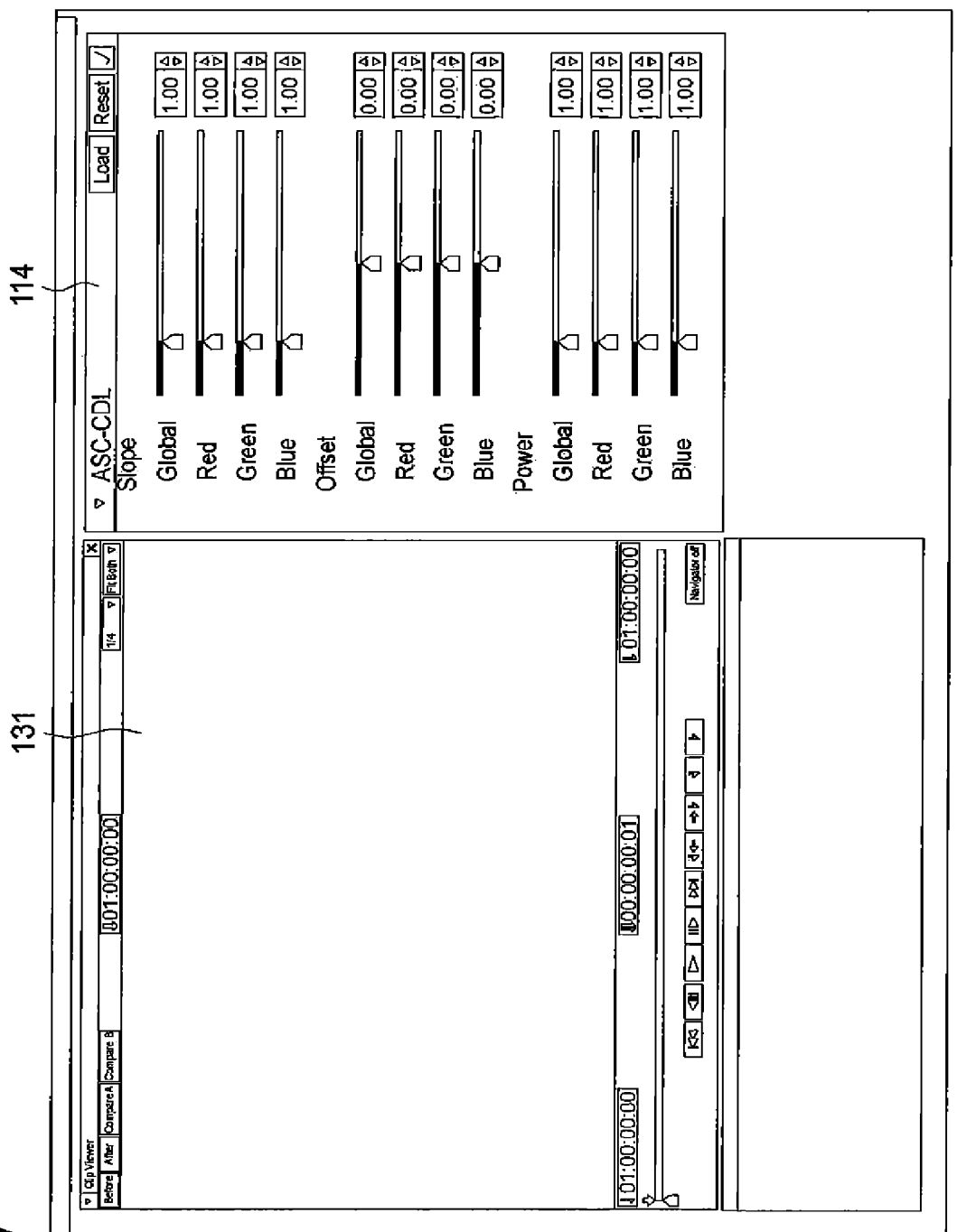
FIG. 7 is a diagram showing an example of a graphical user interface for setting an ASC-CDL.

In the imaging apparatus 100, as shown in FIG. 7 for example, the first metadata acquisition unit 109 acquires the values of the offset, the slope, and the power for each of R, G, and B, which are given by the user using the graphical user interface (GUI) 114, and gathers those values into one to create the ASC-CDL. In the graphical user interface (GUI) 114 shown in FIG. 7, the values of the offset, the slope, and the power for each of R, G, and B can be individually selected by the user operating a slide gauge or an up/down button. The set ASC-CDL is reflected in real time on an image displayed on an image display area 131, and thus the user can make settings of the ASC-CDL while checking the change in color of the image.

The ASC-CDL is transmitted as the second metadata by the transmission unit 111 to the post-production apparatus 200, together with the RAW data and the first metadata. With this, the color correction intended by the photographer, the cinematographer, and the like can be executed in the second color correction unit 205 of the post-production apparatus 200, with the result that the operation efficiency of the post-production can be improved.

Hereinabove, one embodiment of the present technology has been described, but the present technology can be modified as follows.

For the communication between the illuminometer 113 and the imaging apparatus 100, adopting wireless communication is useful. Further, the illuminometer 113 may be formed integrally with the imaging apparatus 100.

In the embodiment described above, the EI, the effective marker, and the ASC-CDL are transmitted as the second metadata from the imaging apparatus 100 to the post-production apparatus 200. However, at least any one of the EI, the effective marker, and the ASC-CDL may be transmitted as the second metadata. Additionally, in the embodiment described above, the EI, the effective marker, and the ASC-CDL are handled as metadata that is not automatically reflected on the development in the post-production apparatus 200. However, at least any one of the EI, the effective marker, and the ASC-CDL may be modified so as to be handled as metadata that is automatically reflected on the development in the post-production apparatus 200.

It should be noted that the present technology is not limited to the embodiment described above and may be variously modified without departing from the gist of the present invention as a matter of course.

The present technology can have the following configurations.

(1) An imaging apparatus, including:
an imaging unit that performs shooting and generates RAW data;
a first conversion unit that converts the generated RAW data into image data by interpolation;
an acquisition unit that acquires an exposure index value corresponding to an illuminance of a shooting environment;
a first correction unit that corrects a value of the image data based on the exposure index value; and
an output unit that associates the RAW data and the acquired exposure index value with each other and outputs the associated RAW data and exposure index value.

(2) The imaging apparatus according to (1), the imaging apparatus according to claim 1, in which the acquisition unit includes an illuminance acquisition unit that acquires a measured value from an illuminometer and converts the measured value into the exposure index value.

(3) The imaging apparatus according to any one of (1) and (2), in which
the acquisition unit further acquires information on an effective area for post-production of the image data, and
the output unit associates the RAW data and the acquired information on an effective area with each other and outputs the associated RAW data and information on an effective area.

(4) The imaging apparatus according to any one of (1) to (3), in which
the acquisition unit further acquires information for a color correction of the image data, and
the output unit associates the RAW data and the acquired information for a color correction with each other and outputs the associated RAW data and information for a color correction.

(5) The imaging apparatus according to any one of (1) to (4), in which
the information for a color correction is the American Society of Cinematographers Color Decision List (ASC-CDL).

(6) An image processing apparatus, including:
an input unit that inputs RAW data output from an imaging apparatus and an exposure index value associated with the RAW data;
a second conversion unit that converts the RAW data into image data by interpolation; and
a second correction unit that corrects a value of the image data based on the exposure index value.

(7) The image processing apparatus according to (6), in which
the input unit further inputs information on an effective area for post-production of the image data, and
the image processing apparatus further includes a clipping unit that clips a part corresponding to the effective area from the image data based on the information on an effective area.

(8) The image processing apparatus according to any one of (6) and (7), in which
the input unit further inputs information for a color correction of the image data, and
the image processing apparatus further includes a color correction unit that performs a color correction of the image data based on the information for a color correction.
(9) The image processing apparatus according to any one of (6) to (8), in which
the information for a color correction is the American Society of Cinematographers Color Decision List (ASC-CDL).

DESCRIPTION OF REFERENCE NUMERALS 100 imaging apparatus
101 camera imager
102 RAW file write unit
103 first Debayer processing unit
104 intensifying and weakening/gain adjustment/color space conversion unit
105 first IDT processing unit
106 first color correction unit
107 first ODT processing unit
108 effective marker combination unit
109 first metadata acquisition unit
110 second metadata acquisition unit
111 transmission unit
112 EI acquisition unit
113 illuminometer
114 graphical user interface
200 post-production apparatus
201 RAW data/metadata acquisition unit
202 second Debayer processing unit
203 intensifying and weakening/gain adjustment/color space conversion unit
204 second IDT processing unit
205 second color correction unit
206 effective marker processing unit
207 second ODT processing unit

The invention claimed is:

1. An imaging apparatus, comprising:
an imager configured to generate RAW video data by imaging of a subject; and
circuitry configurable to:
be operable to produce first metadata associated with the RAW video data, the first metadata including at least one of white balance, ISO sensitivity and gamma information,
be operable to process the RAW video data to generate an image signal for displaying image information,
be operable to produce second metadata including setting information set by a user, the setting information including at least a color decision list related to color of the RAW video data, and
be operable to output the RAW video data, without applying debayering, the first metadata and the second metadata in association with each other in order to provide the RAW video data for an external image processing device for post-production,
wherein the RAW video data are processable at least in accordance with the setting information included in the second metadata at the post-production.

2. The imaging apparatus of claim 1, wherein the first metadata includes at least two of the white balance, ISO sensitivity and gamma information.

3. The imaging apparatus of claim 1, wherein the circuitry is configurable to be operable to convert a color space of image data into a standard color space from a color space of the imager.

4. The imaging apparatus of claim 1, wherein the circuitry is configurable to be operable to debayer the RAW video data.

5. The imaging apparatus of claim 1, wherein the ISO sensitivity is settable to at least 800.

6. The imaging apparatus of claim 1, wherein the setting information included in the second metadata includes at least one of exposure index, effective marker and color decision list (CDL) information.

7. The imaging apparatus of claim 1, wherein the setting information included in the second metadata includes include at least information related to the American Society of Cinematographers Color Decision List (ASC CDL).

8. The imaging apparatus of claim 1, wherein the second metadata includes at least one of an offset, a slope and a power of at least one color components included in the RAW video data as a parameter to define color for the American Society of Cinematographers Color Decision List (ASC CDL).

9. The imaging apparatus of claim 1, including a graphical user interface operable by a user to select an item of the second metadata as the setting information.

10. The imaging apparatus of claim 1, wherein the output RAW video data is output in a file.

11. The imaging apparatus of claim 10, wherein at least one of the first or second metadata is output in another file.

12. The imaging apparatus of claim 11, wherein the file that is output of the at least one of the first or second metadata is associated with the file of the output RAW video data.

13. The imaging apparatus of claim 1, wherein the circuitry is further configurable to be operable to cause a display to display the image with characteristics determined in real time in response to manual input of selectable information.

14. The imaging apparatus of claim 1, wherein the circuitry is configurable to be operable to convert an illuminance value from an illuminometer into an exposure index value in the second metadata.

15. The imaging apparatus according to claim 10, wherein the circuitry is configurable to be operable to perform an interpolation process based on the RAW video data.

16. The imaging apparatus according to claim 1, wherein the circuitry is configurable to be operable to perform a color correction process based on the RAW video data.

17. The imaging apparatus according to claim 1, wherein the first metadata includes a log gamma curve associated with the RAW video data.

18. The imaging apparatus of claim 1, wherein the log gamma curve is one of plural predetermined log gamma curves.

19. An imaging apparatus, comprising:
an imager configured to generate RAW video data by imaging of a subject; and
circuitry configurable to:
be operable to produce first metadata associated with the RAW video data, the first metadata including at least one of white balance, ISO sensitivity and gamma information,
be operable to process the RAW video data to generate an image signal for displaying image information,
be operable to produce second metadata including setting information set by a user, the setting information including at least a color decision list related to color of the RAW video data, and be operable to store the RAW video data, the first metadata and the second metadata in association with each other without applying debayering to the RAW video data, in order to process the RAW video data at an external image processing device for post-production, wherein the RAW video data are processable at least in accordance with the setting information included in the second metadata at the post-production.

20. The imaging apparatus of claim 19, wherein the color decision list is the American society of Cinematographers Color Decision List (ASC CDL).

21. The imaging apparatus of claim 20, wherein the second metadata includes an offset of at least one color components included in the RAW video data as a parameter to define color for the ASC CDL.

22. The imaging apparatus of claim 20, wherein the second metadata includes a slope of at least one color components included in the RAW video data as a parameter to define color for the ASC CDL.

23. The imaging apparatus of claim 20, wherein the second metadata includes a power of at least one color components included in the RAW video data as a parameter to define color for the ASC CDL.

24. The imaging apparatus of claim 19, wherein the setting information included in the second metadata includes information for identifying an effective area in the image.

\* \* \* \* \*